(12) United States Patent
Choy

(10) Patent No.: US 8,874,517 B2
(45) Date of Patent: Oct. 28, 2014

(54) SUMMARIZING FILE SYSTEM OPERATIONS WITH A FILE SYSTEM JOURNAL

(75) Inventor: Jack Choy, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2042 days.

(21) Appl. No.: 11/700,805

(22) Filed: Jan. 31, 2007

(65) Prior Publication Data
US 2008/0183773 A1     Jul. 31, 2008

(51) Int. Cl.
*G06F 17/30* (2006.01)
*G06F 11/14* (2006.01)

(52) U.S. Cl.
CPC .................................. *G06F 11/1451* (2013.01)
USPC ....................................................... 707/640

(58) Field of Classification Search
CPC ............ G06F 11/1451; G06F 11/1469; G06F 11/1464
USPC .......... 707/200, 202, 203, 204, 205, E17.005, 707/640; 711/162
See application file for complete search history.

(56) References Cited

U.S. PATENT DOCUMENTS

| | | | |
|---|---|---|---|
| 4,020,466 A * | 4/1977 | Cordi et al. ........................ | 1/1 |
| 6,021,414 A | 2/2000 | Fuller | |
| 6,189,016 B1 | 2/2001 | Cabreera et al. | |
| 6,606,685 B2 * | 8/2003 | Huxoll ........................ | 711/118 |
| 6,714,951 B2 * | 3/2004 | Bills et al. .................... | 707/610 |
| 7,464,114 B2 * | 12/2008 | Adkins et al. ................. | 707/200 |
| 7,681,001 B2 * | 3/2010 | Maruyama et al. ........... | 711/165 |
| 8,392,681 B2 * | 3/2013 | Satoyama et al. ............ | 711/162 |
| 2002/0152195 A1 * | 10/2002 | Bills et al. ........................ | 707/1 |
| 2003/0191782 A1 * | 10/2003 | Buxton et al. ................. | 707/202 |
| 2005/0027956 A1 * | 2/2005 | Tormasov et al. ............ | 711/162 |
| 2006/0047713 A1 * | 3/2006 | Gornshtein et al. .......... | 707/202 |
| 2007/0094312 A1 * | 4/2007 | Sim-Tang ..................... | 707/204 |
| 2007/0214334 A1 * | 9/2007 | Maruyama et al. ........... | 711/165 |
| 2007/0294274 A1 * | 12/2007 | Kano ............................. | 707/101 |
| 2009/0193061 A1 * | 7/2009 | Niwata et al. ................. | 707/204 |
| 2012/0191932 A1 * | 7/2012 | Satoyama et al. ............ | 711/162 |

OTHER PUBLICATIONS

Steve Best, "Journaled File System (JFS) for Linux", O'Reilly Open Source Convention, San Diego, Jul. 25, 2002.*

* cited by examiner

*Primary Examiner* — Sheree Brown

(57) ABSTRACT

Embodiments include methods, apparatus, and systems for summarizing file system operations with a file system journal. One embodiment includes a method that stores journal operations for files in a journal file system into a hierarchical tree. The method then summarizes changes made to the files in the hierarchical tree to determine which files require being read and backed up due to changes to content and which files have change but do not require being read and backed up.

20 Claims, 11 Drawing Sheets

| Journal Log | | | | |
|---|---|---|---|---|
| ID | Object Type | Name | CM | Other |
| 1 | File | Filename1 | Create | |
| 2 | Directory | Dirname1 | Delete | |
| 3 | File | Filename2 | Rename | File3 (Dest) |
| ... | ... | ... | ... | ... |
| N-1 | N-1 Obj | N-1 Name | N-1 Operation | N-1 Other |
| N | N Obj | N Name | N Operation | N Other |

| Journal Log | | |
|---|---|---|
| ID | Various record fields in the journal log | |
| ... | ... | |
| N-1 | Record data for N-1 | } After "walk" (400) |
| N | 430 | Record data for N |
| N+1 | | Record data for N+1 |
| ... | | ... |
| O-1 | | Record data for O-1 |
| O | 450 | Record data for O |
| O+1 | | Record data for O+1 |
| ... | | ... |
| P-1 | | Record data for P-1 |
| P | 470 | Record data for P |

} Backup O (410)

} Backup P (420)

FIG. 4A

After Walk

| Journal Log | |
|---|---|
| ID | Record fields in the journal log |
| ... | ... |
| N-1 | Record data for N-1 |
| N | Record data for N |

Last ordinal ID →

FIG. 4B

Representation of a node in the tree

500

| Parent | | VF |
| --- | --- | --- |
| Obj Type | | |
| N | Object Name | VD |
| C | | |
| X | | IF |
| M | | |
| P | Source name | ID |
| W | Ptr to Mirror Node | |

Maps to child objects

Inserting creations of files and directories into the tree

Inserting deletions of files and directories into the tree

Inserting modifications/changes of files and directories into the tree

SUMMARIZING FILE SYSTEM OPERATIONS WITH A FILE SYSTEM JOURNAL

BACKGROUND

Some computer systems maintain one or more copies of data so data can be restored after a data loss event. Backups or copies of data are useful for restoring a computer to an operating state after a disaster or restoring a file after it is deleted or corrupted.

Data storage requirements can be considerable since a backup system contains at least one copy of all data. The processes of managing backup operations and organizing storage are complex, time consuming, and in some instances costly.

In an effort to make backup operations more efficient, some backup systems only copy files and directories that have changed since the last backup. In other words, if a file has not changed since the last backup, it is not copied again since a backup version of the file already exists. At the same time, if a file is marked as having a change, then the entire filed is copied again during the next backup operation.

In traditional backup systems, files and directories are marked as being changed even though the data itself did not change. For example, if a user views a file, moves a file to a new directory, renames a file, or changes an access control list (ACL) attribute, then the file is marked as being changed. During a subsequent backup operation, the entire file is recopied even though the content of the file did not change.

Backup systems that copy every file marked as being changed are inefficient since processing resources, time, and ultimately money are unnecessarily spent to recopy data that did not actually change.

BRIEF DESCRIPTION OF THE DRAWINGS

FIG. 4A shows a simplified representation of journal records in a journal log over a series of backups in accordance with an exemplary embodiment of the present invention.

FIGS. 4B, 4C, and 4D show a representation of a journal representation over time in accordance with an exemplary embodiment of the present invention.

DETAILED DESCRIPTION

Embodiments in accordance with the present invention are directed to apparatus, systems, and methods for summarizing file system operations with a file system journal. One embodiment summarizes point-in-time file system operations from a file system journal using a hierarchical tree algorithm.

In one exemplary embodiment, a method tracks and summarizes what operations have actually happened to a file system from one point in time to the next point in time. Changes to files and directories are logged in a journal using a hierarchical tree (example, using maps of maps). All the information from a file system journal from some start time to some end time is retrieved and stored into hash maps. The maps are then parsed to summarize all the operations that have occurred during the given time period. In this manner, exemplary embodiments track which files and/or directories changed during the time period. For example, when a user moves a file numerous different times within the file system, a summarization records and shows the location of the source of the file at the start time to the destination of the file at the end time (i.e. summarization).

One exemplary embodiment places all file system journal operations into a tree as the operations occur. These operations include, but are not limited to, creation, deletion, move, metadata change, and content change of a file or a directory. The changes are stored in a hierarchical tree (using a map of maps). The tree goes thru continual changes as each entry in the journal is sequentially read into the tree. After all journal entries are read, the tree is parsed to summarize all the changes that have occurred. This summarization of activities is stored and the provided to a back-end backup system. Using the summarization, the backup system determines what and how changes were made to files and directories. In other words, the backup system accurately determines what additional information or data is required to backup the incremental changes that have occurred on a file system.

Backup systems in accordance with the present invention are efficient since files with unchanged content are not read and backed up merely because the file is marked as being changed. For example, if a user views a file, moves a file to a new directory, renames a file, performs a change to metadata, or changes an access control list (ACL) attribute, then the file is marked as being changed. During a subsequent backup operation, however, the entire file is not read and backed up since the content of the file did not change. Instead, the specific change is recorded, but the contents of the file are not recopied since the content or data in the file remained unchanged. Backup systems utilizing embodiments in accordance with the present invention are more efficient since processing resources, time, and ultimately money are not unnecessarily spent to read and backup data that did not actually change.

Figure 1:
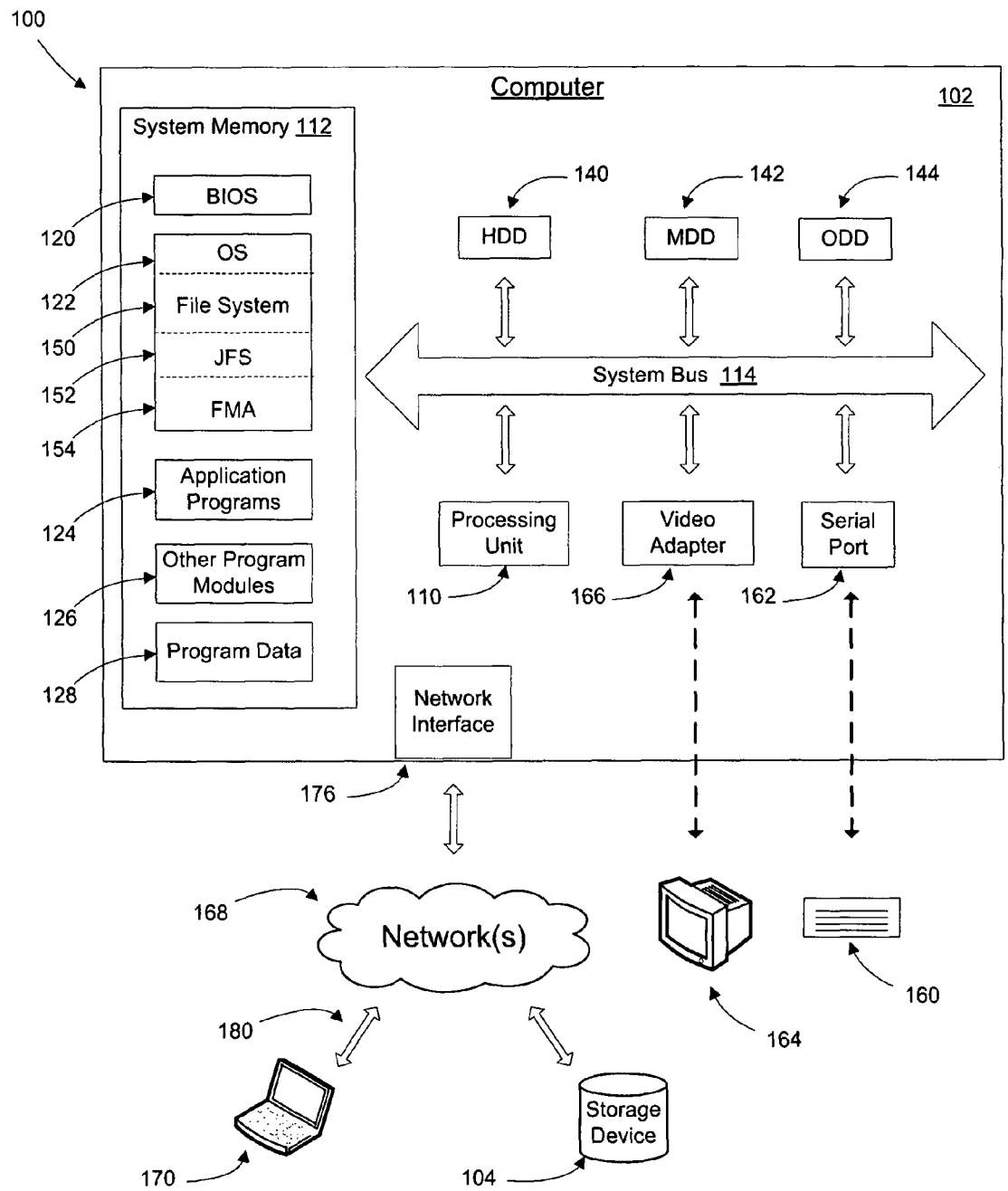
FIG. 1 is a block diagram of a storage system in accordance with an exemplary embodiment of the present invention.

FIG. 1 is a block diagram of a computer or storage system 100 in accordance with an exemplary embodiment of the present invention. In general, the system 100 includes at least one computer 102 and one or more storage devices 104. The computer 102 comprises a processing unit 110, a system memory 112, and a system bus 114 that operatively couples various system components, including the system memory to the processing unit 110. The processing unit can include one or more processors, such as a single central-processing unit (CPU) or a plurality of processing units, commonly referred to as a parallel processing environment.

The system bus 114 can be any of several types of bus structures, such as a memory bus or memory controller bus, a peripheral bus, and a local bus using any of a variety of bus architectures. Further, by way of example, the system memory 112 includes, but is not limited to, read only memory (ROM) and random access memory (RAM) having a basic input/output system (BIOS) 120, an operating system (OS) 122, application programs 124, other program modules 126, and program data 128. The BIOS contains routines that help to transfer information during start-up between elements within the computer 102. The computer 102 further includes a hard disk drive (HDD) 140 for reading from and writing to a hard disk, a magnetic disk drive (MDD) 142 for reading from and writing to a removable magnetic disk, and an optical disk drive (ODD) 144 for reading from or writing to a removable optical disk, such as a compact disk (CD), digital video disk (DVD), or other optical media. The drives and their associated computer-readable media provide nonvolatile storage of computer-readable instructions, data structures, program modules and other data for the computer 102. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules and data structures can be stored on the media readable hard disk drive 140, magnetic disk drive 142, optical disk drive 144, ROM, or RAM. These programs and data structures include the operating system 122, one or more application programs 124, other program modules 126, program data 126, and algorithms associated with exemplary embodiments.

In one embodiment, the operating system 122 comprises a file system 150, a journal file system (JFS) 152, and a file management algorithm (FMA) 154. The operating system 122 administers data storage of objects on a media storage device (such as storage device 104) using the file system 150. The file system 150 allocates the storage of objects to files and directories. The JFS 152, in combination with the FMA 154, administers journaling of objects stored by the file system by summarizing point-in-time file system operations using a hierarchical tree. One embodiment of a method performed by the FMA 154 is described below with reference to FIGS. 3 and 4.

By way of illustration, the file system 150, the JFS 152, and the FMA 154 are part of the operating system 122. In another embodiment, however, the FMA 154 is a stand-alone program module, example included in the program modules 126 or elsewhere internal or external to the computer 102.

A user enters commands and information into the computer 102 through one or more input devices, such as a keyboard 160. The keyboard and other devices are connected to the processing unit 110 through a serial port interface 162 that is coupled to the system bus, but can be connected by other interfaces, such as a parallel port or a universal serial bus (USB). A monitor 164 or other type of display device is also connected to the system but 114 through an interface, such as a video adapter 166.

In one exemplary embodiment, the computer 102 uses a network interface 176 to connect to one or more networks 168 using logical connections to one or more remote computers, such as a remote computer 170. These logical connections are achieved by a communication device coupled to or part of the computer 102. In one embodiment, the remote computer 170 includes one or more of another computer, a server, a router, a network personal computer (PC), a client, a peer device, or other network node.

By way of example, network 168 includes one or more of the internet, local area network (LAN), wide area network (WAN), etc. Communications links 180 are shown in the figure to represent communication paths or couplings between hosts, computers, storage devices, etc. By way of example, such links include one or more small computer system interface (SCSI) buses and/or interfaces. Further, in a networked environment, program modules depicted relative to the computer 102, or portions thereof, can be stored in the remote memory storage device or other remote locations. It is appreciated that the network connections shown are exemplary and other means of and communications devices for establishing a communications link between the computers may be used.

Figures 2A, 2B:
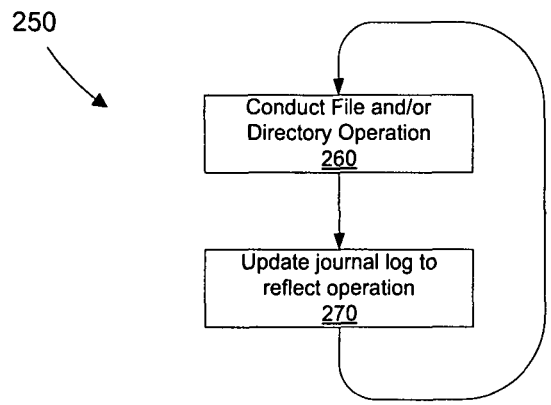
FIG. 2A is a model of a journal when a file system operation occurs in accordance with an exemplary embodiment of the present invention.
FIG. 2B is a table of a journal log in accordance with an exemplary embodiment of the present invention.

FIG. 2A is a simplistic model 250 of the journal when a file system operation occurs. As each file system operation takes place, the file system journal creates an ordinal record of each operation into the journal as represented in FIG. 2B.

As shown in block 260, a file and/or directory operation is conducted. This action leads to block 270 wherein an update to the journal log occurs to reflect the operation that occurred in block 260. The model then loops back to block 260.

FIG. 2B is a table of a journal log 200 in accordance with an exemplary embodiment of the present invention. In one exemplary embodiment, the journal log is part of the JFS 152 (FIG. 1) and includes a plurality of journal records 210A-210E. 210E represents the last entry in the journal log.

Each journal record 210 comprises a plurality of fields, such as an object type, a filename, a unique and ordinal identification (ID), a classify modification (CM) which represents the operation type, and other types of fields. By way of example, the object type is a descriptor used to indicate the type of object contained in the journal record. Examples of objects include, but are not limited to, directory objects, file objects and data objects. The object name is a descriptor that identifies the object with, for example, a filename or directory name. The other fields designation indicates addition of one or more other fields, such as one or more recorded version numbers, a time stamp, record length, the security descriptor assigned to the file, file attributes and the length in bytes of the name of the file. It is noted that this is only one example of a journal log with records and that many other log/record formats are suitable for achieving the functions provided herein.

The classify modification (CM) field indicates the type of change being made to a file or directory. The designation in the CM field depends on the type of change. By way of example, the CM field is used to distinguish between different types of changes, such as one or more of the following types of changes: viewing a file/directory, moving a file to a new directory, renaming a file/directory, performing a change to metadata, changing an access control list (ACL) attribute, adding/modifying/deleting content or data, etc. Other types of changes or modifications to files and directories can also be tracked, classified, and stored. Such other types include, but are not limited to, data overwrite, creating files/directories, deleting files/directories, property changes, security changes, compression changes, encryption changes, stream changes, index changes, hard link changes, object identification changes, etc.

Generally, the CM field is configured to indicate a type of change being made to a file or directory in order to distinguish between data and/or content changes that require the file to be recopied during backup or other changes that do not require the file to be recopied during backup. By way of example, the journaling of these changes takes the form of one or more ASCII symbols or bits representing the type of change being made to a file and/or directory.

Figure 3:
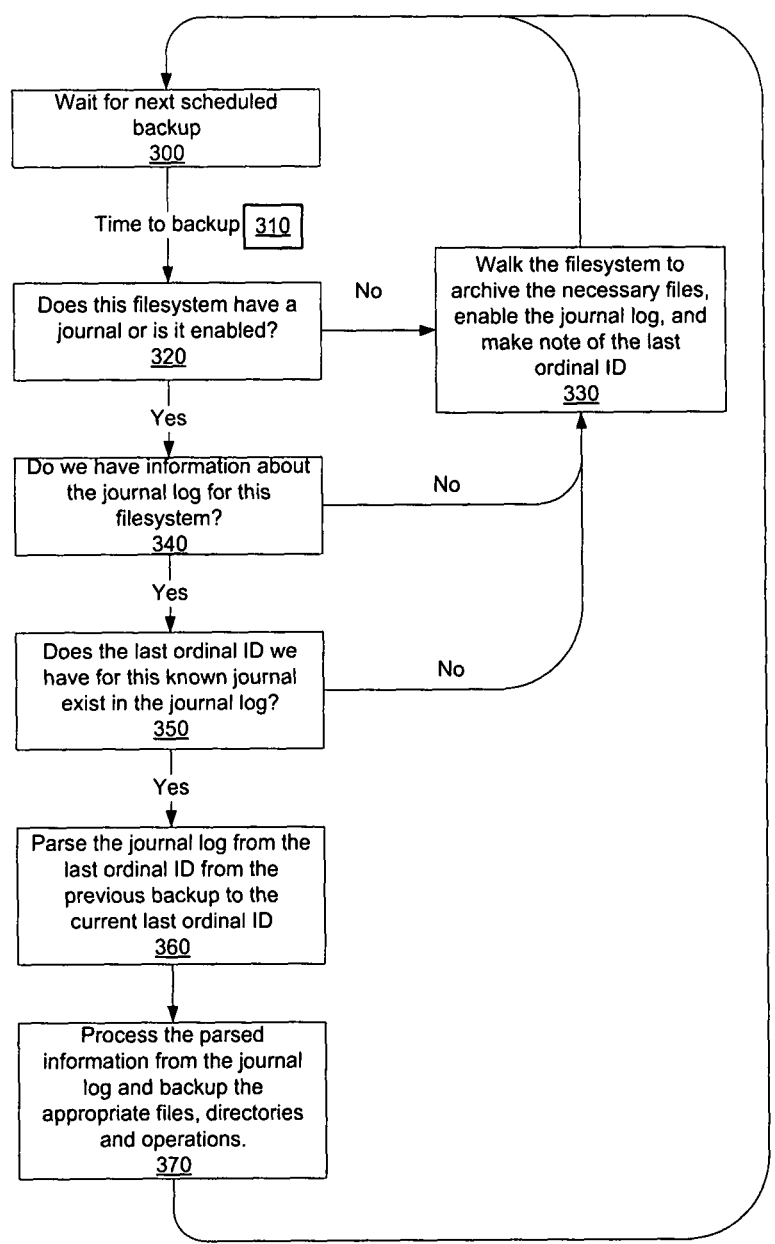
FIG. 3 represent a flowchart for determining whether an application should retrieve information from the journal in accordance with an exemplary embodiment of the present invention.

FIG. 3 represents a flowchart for determining whether the application should retrieve information from the journal.

FIG. 4A shows a simplified representation of the journal records in the journal log over a series of backups. Exemplary embodiments will use this for a backup example. In this figure, three backups have occurred. After a walk of the file system has occurred 400, the last operation recorded in the journal log is at 430 where the last ordinal ID is N. A walk is a parsing and backing up of the entire file system. After some time, another scheduled backup 410 occurs, and the last operation recorded in the journal log is at 450. After some more time, another scheduled backup 420 occurs and the last operation recording in the journal log is at 470.

Figure 4C:
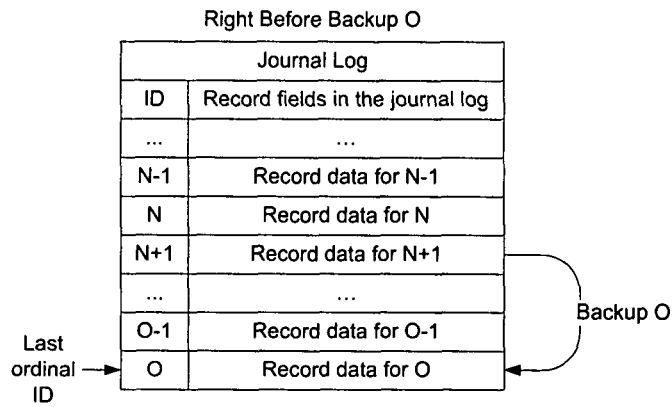
Figure 4D:
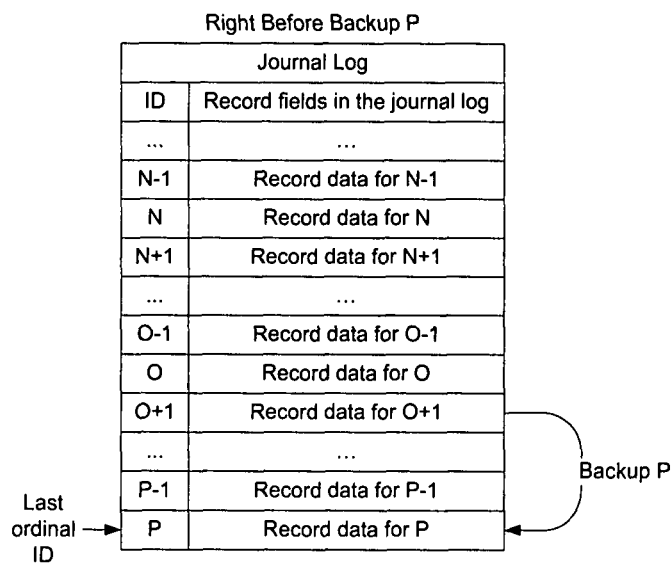

FIGS. 4B, 4C, and 4D show a representation of the journal representation over time. FIG. 4A shows a compressed version of FIGS. 4B, 4C, and 4D.

FIG. 4B shows that the last ordinal ID points to record N after the method has performed an initial backup of the system. When it is time to perform the second backup (Backup O), the method parses the entries in the journal log between record ID N+1 to record ID O as shown in FIG. 4C. After successfully parsing these records and performing Backup O, the method saves the last ordinal ID, which in this case, is ID: O. Again, after some time, it is decided to perform another backup (Backup P), the method parses the entries in the journal log between record ID O+1 to record ID P as shown in FIG. 4D. After successfully parsing these records and performing Backup P, the method saves the last ordinal ID, which in this case, is ID:P. This cycle continues repeatedly.

In FIG. 3, block 300 shows the method waiting for the next scheduled backup. When a backup of the file system is performed for the first time using the journaling capabilities herein 310, it is necessary to get an image of the file system as well as enable the file system's journaling capabilities. This information is needed so that when future operations are processed, the application will know how to handle the creation, deletion, and modifications of the object on the backend storage device.

If the file system has a journal log and the application knows about this journal log as well as various characteristics about the journal log for the file system (such as a unique ID representing the file system, a unique ID representing the journal log for the file system, and the last ordinal ID for the previous backup) 320, then flow proceeds to 340.

If the application determines the file system journaling capabilities have not been enabled, the application will walk the file system 330. Walking the file system involves parsing the entire structure of the file system and backing up the entire file system. If the file system has journaling capabilities, exemplary embodiments enable it and capture information regarding the journal such as the unique ID representing the file system (in case file system was reformatted), the unique ID representing the journal log (in case the journal log was deleted and recreated), and the last ordinal ID representing the last operation that occurred on the file system when the method parsed the information in the journal log. In our example, let's indicate N in FIG. 4 (see 400) as the last ordinal ID after the method "walked" the file system.

According to block 340, if the method has all the necessary information in the journal, the method proceeds to block 350. If the method does not have all the necessary information regarding the journal, the method flows to block 330 and gets this information, as well as walks the file system to get to a known state.

According to block 350, the method verifies to see if the last ordinal ID is available in the journal. Many implementations of the journal log have a limited size which does not allow entering an infinite number of entries into the log. In such cases, exemplary embodiments make sure that the last known ordinal ID since the previous backup still exists within journal log. If it does not exist, the method moves to block 330 and walks the file system as well as retrieves the last known ordinal ID.

If the conditions in blocks 320, 330, 340, and 350 are satisfied, the method proceeds to parse the journal log from the last known ordinal ID to the current last ordinal ID as shown in block 360. In FIG. 4C, this would be from record N+1 to record O. In FIG. 4D, this would be from record O+1 to P.

According to block 370, after block 360 is finished, the method processes the parsed information into a summarized list of file system operations. The method then uses the resultant summarized list to determine which files need to be backed up, moved, deleted, and/or renamed.

When processing information from the journal, exemplary embodiments are interested in the operations that contain file and directory deletions, creations, modifications, moves, and renames. Each of these operations is parsed in sequential order and inserted into a tree representation. Every object, whether it be a file or directory, that is changed is represented by a node in the tree. The node contains information containing representing the changes that have occurred.

Figures 5, 6:
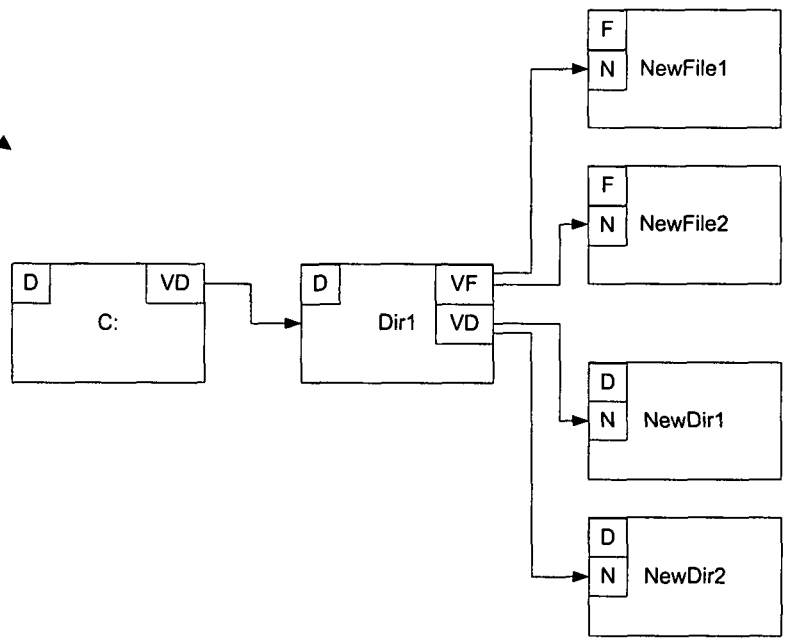
FIG. 5 shows a representation of a node in a tree in accordance with an exemplary embodiment of the present invention.
FIG. 6 shows inserting creations of files and directories into a tree in accordance with an exemplary embodiment of the present invention.

FIG. 5 shows the representation 500 of the node in the tree. The node contains the following properties:

1. Object Name—This represents the name of the object such as a file or directory.
2. Source Name—This represents the original name of the object before it was moved or deleted.
3. Parent—This is a pointer to the parent directory for this object.
4. Object Type—This indicates whether the object is a file or a directory.
5. New Flag [N]—When set, this indicates a newly, created object.
6. Changed Flag [C]—When set, this indicates the object has been modified. Rather than subclassing all the different types of changes (ACL, metadata, content, attributes, etc), it has been simplified as any type of change to the object.
7. Deleted Flag [X]—When set, this indicates the object has been deleted.
8. Moved Flag [M]—When set, this indicates the object was moved.
9. Processed Flag [P]—When set, this indicates the object has been processed during the post-processing of the tree. Post-processing of the tree occurs only after all the operations were parsed from the change log.
10. Walk Flag [W]—When set, this indicates the directory needs to be walked. This is usually set in the case of directory moves.

11. Pointer to Mirror Node—This points to either the destination or source of the move and is only valid when the move flag is set.
12. Visible Child File Map [VF]—This is a map containing the visible child files of this node where the keys in the map are the names of the child file objects and the values in the map are pointers to the file nodes.
13. Visible Child Directory Map [VD]—This is a map containing the visible child directories of this node where the keys in the map are the names of the child directory objects and the values in the map are pointers to the directory nodes.
14. Invisible Child File Map [IF]—This is a map containing the invisible child files of this node where the keys in the map are the names of the child file objects and the values in the map are pointers to the file nodes.
15. Invisible Child Directory Map [ID]—This is a map containing the invisible child directories of this node where the keys in the map are the names of the child directory objects and the values in the map are pointers to the directory nodes.

The maps are only valid if this node represents a directory. "Invisible" children actually represent files or directories that have been deleted.

To demonstrate create operations into the tree, FIG. 6 shows an example 600 of what tree would look like when exemplary embodiments started with a blank slate and created two new files (C:\Dir1\NewFile1 and C:\Dir1\NewFile2) and two new directories in the file system (C:\Dir1\NewDir1 and C:\Dir2\NewDir2).

In one example, the method needs to parse the following operations in order into the tree:
1. Create new file C:\Dir1\NewFile1,
2. Create new file C:\Dir1\NewFile2,
3. Create new directory C:\Dir1\NewDir1,
4. Create new directory C:\Dir1\NewDir2.

In FIG. 6, when an attempt is made to insert the creation of C:\Dir1\NewFile1, it is necessary to create a node for C: and a node for Dir1 first. When any operation is performed and the nodes to perform these operations do not yet exist, they are automatically created with none of the flags set. These nodes are created and a linkage is created between C: and Dir1 thru C:'s VD map. A linkage also exists between Dir1 and C: thru Dir1's Parent pointer which is not shown in the diagram to reduce clutter. From Dir1, the method creates a NewFile1 object and link the object thru Dir1's VF map. The NewFile1 object is also marked a file object type [F] and the new flag [N] is set because this is a creation of the object on the file system.

In FIG. 6, when it comes time to insert the creation of C:\Dir1\NewFile2 into the tree, the nodes C: and Dir1 have already been created, so all that is needed is to insert a new file node [F] into Dir1's VF map and set the new flag [N] and set the name, NewFile2.

In FIG. 6, when it comes time to insert the creation of C:\Dir1\NewDir1 and C:\Dir1\NewDir2 into the tree, the method adds the new nodes, NewDir1 and NewDir2, into Dir1's VD map and set the new flag [N] on these nodes as well as set the object type to Directory [D].

To demonstrate remove operations into the tree, take the tree in FIG. 6 and perform the following operations in order into the tree:
1. Delete file C:\Dir1\NewFile2
2. Delete file C:\Dir1\DelFile1
3. Delete directory C:\Dir1\NewDir2
4. Delete directory C:\Dir1\DelDir1

Figure 7:
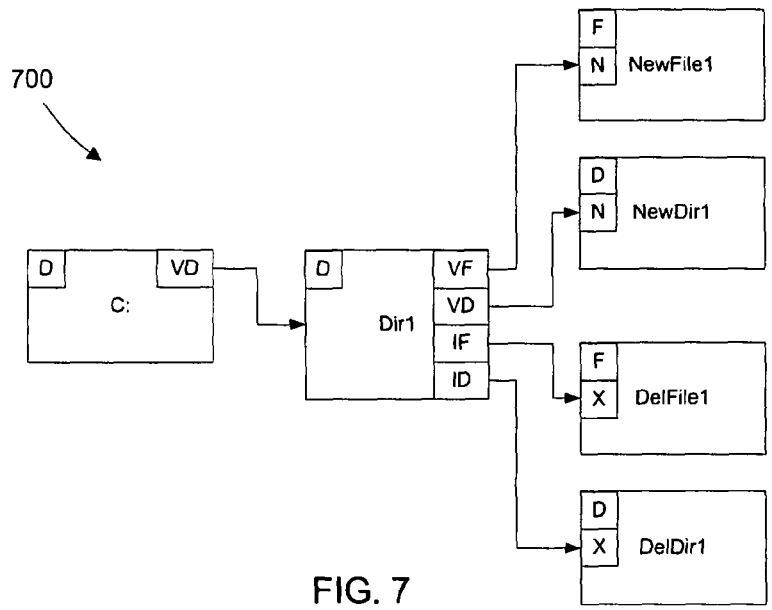
FIG. 7 shows inserting deletions of files and directories into a tree in accordance with an exemplary embodiment of the present invention.

The resultant tree 700 is shown in FIG. 7.

To describe FIG. 7 and the operations shown above, when the deletion of C:\Dir1\NewFile2 occurs, it is simply deleted from the tree because the New flag was set. In other words, since the last backup when a user creates a file and then later deletes it before the next backup, there is no need to keep track of it anymore as it was a transient object in between backups.

In FIG. 7, in the case of the deletion of C:\Dir1\DelFile1, this file existed in the previous backup, but now this file no longer exists. As a result, an entry must be made in the tree to reflect this deletion. In this particular case, the method inserts a new node with name of DelFile1 into Dir1's IF map. The DelFile1 node has the Delete flag set [X] and the object type is File [F].

For the deletion of directories C:\Dir1\NewDir2 and C:\Dir1\DelDir1, the same behavior is applied as the deletion of files described above except that the DelDir1 node is marked as a directory and inserted in the ID map of Dir1.

To demonstrate object modifications/changes into the tree, take FIG. 7 and perform the following operations in order:
1. Change made on C:\Dir1\NewFile1,
2. Change made on C:\Dir1\NewDir1,
3. Change made on C:\Dir1\ChFile1,
4. Change made on C:\Dir1\ChDir1,
5. Change made on C:\Dir1.

Figure 8:
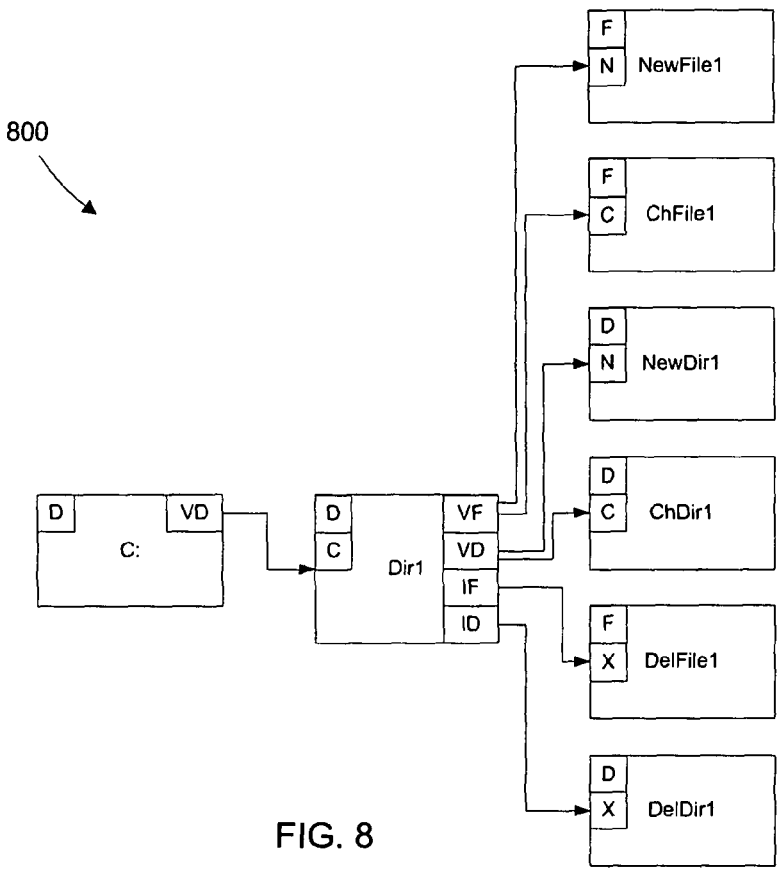
FIG. 8 shows inserting modifications/changes of files and directories into a tree in accordance with an exemplary embodiment of the present invention.

The resultant tree 800 is described in FIG. 8. Again, rather than specifying all possible types of changes (such as ACL changes, metadata changes, content changes, attribute changes), it has been simplified as any change.

To describe FIG. 8 and the operations shown above, when a change is perform on nodes already marked as new [N], nothing happens. This is the case for changes made to C:\Dir1\NewFile1 and C:\Dir1\NewDir1. Nodes marked as new require a full backup as it does not yet exist in the backup medium.

In FIG. 8, changes made to files that have been backed up previously are inserted into the tree indicating a need to backup the file again. This is the case for changes made to C:\Dir1\ChFile1 and C:\Dir1\ChDir1. They are inserted as new nodes into the tree under Dir1's VD map with the nodes set as Directory[D] and have the Change flag [C] set.

In FIG. 8, when a change is made to an already existing node, the node will have the Change flag [C] set. This is indicated in the change made to C:\Dir1 where Dir1 has the Change flag [C] set.

To demonstrate object renames/moves into the tree, let's take FIG. 8 and perform the following operations in order:
1. Rename C:\Dir1\ChFile1 to C:\Dir1\ChFile2,
2. Move C:\Dir1\NewFile1 to C:\Dir1\ChDir1,
3. Move C:\Dir1\MoveFile1 into C:\Dir1\ChDir2\MoveFile2.

Figure 9:
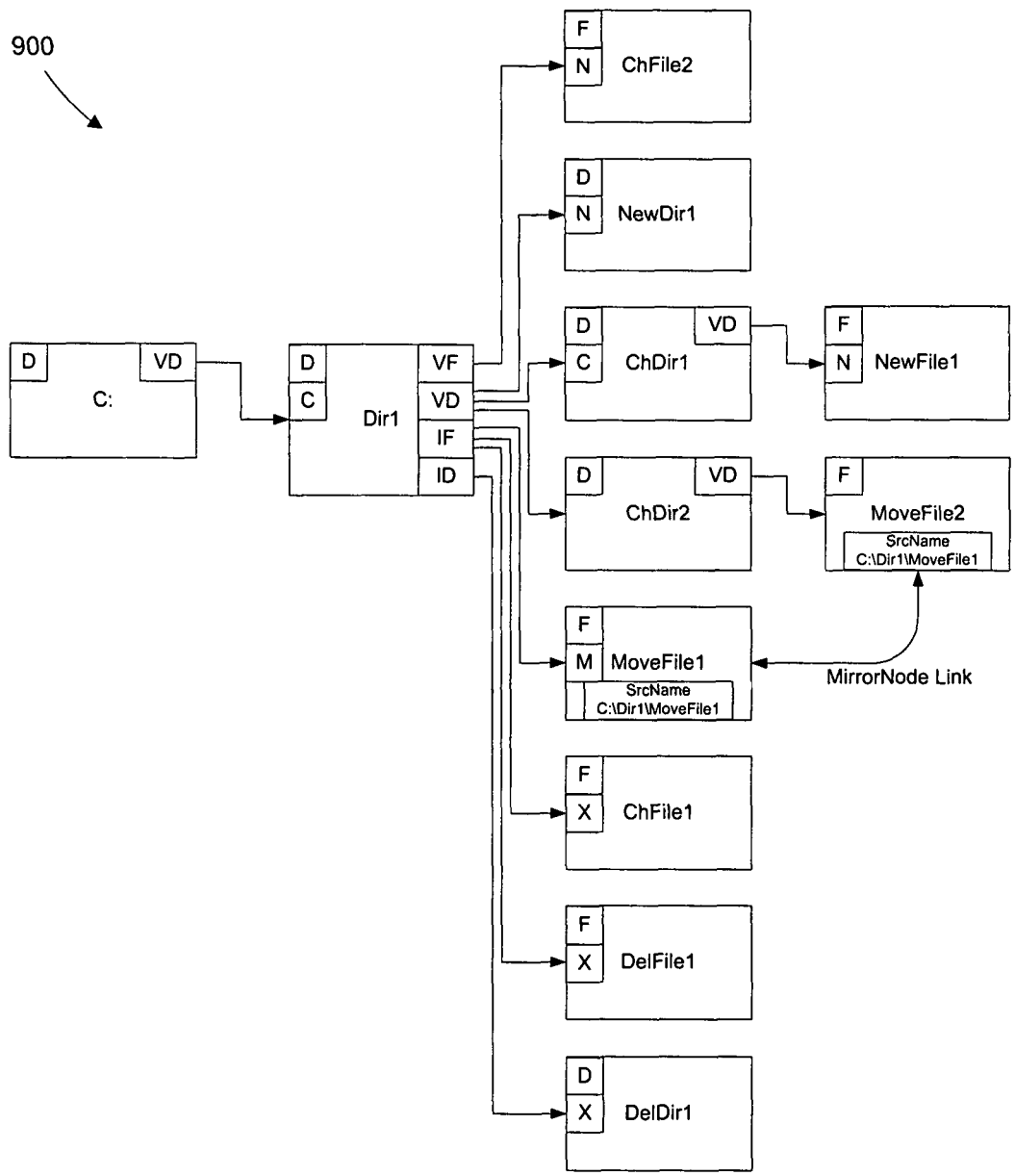
FIG. 9 shows inserting moves and renames of files and directories into a tree in accordance with an exemplary embodiment of the present invention.

The resultant tree 900 is shown in FIG. 9.

In the first operation (Rename C:\Dir1\ChFile1 to C:\Dir1\ChFile2), it is known that ChFile1 was modified previously due to the Change Flag [C]. Since the file is renamed, the method can summarize this operation as two operations: a creation of a new file (C:\Dir1\ChFile2) and a deletion of the old file (C:\Dir1\ChFile1). This is reflected in the tree as a new node under Dir1's VF map called ChFile2 with the New flag [N] set and a new node under Dir1's IF map called ChFile1 with the Delete flag [X] set.

In FIG. 9, when a file with the New flag [N] is set, the source of the move is moved to the appropriate location. This occurs in the "Move C:\Dir1\NewFile1 to C:\Dir1\ChDir1" operation. NewFile1 has the New flag [N] set, so there is no need to keep track of where it originally came from. The method just moves it appropriately into C:\Dir1\ChDir1's VD map.

However, in the case of an operation where a move occurs and the source is not a new object, the method needs to keep track of where the object came from and create a linkage to the new destination. For this example, the method uses the operation "Move C:\Dir1\MoveFile1 to C:\Dir1\ChDir2". In this operation both the file, MoveFile1, and the directory, ChDir2, does not yet exist in the tree. Thus, both of them are created. MoveFile1 is created under the Dir1 node's IF map because once the move takes place, it is no longer in the Dir1 directory and considered "invisible". This MoveFile1 node has the Move flag [M] set to indicate the source of the move. ChDir2 is automatically created under Dir1's VD map so that the method can place MoveFile2 under ChDir2's VD map. A linkage is created between the two to indicate the move relationship. The Sourcename on both the MoveFile1 and MoveFile2 node is set to the full absolute path name of the source of this move operation. In this case, it would be set to "C:\Dir1\MoveFile1".

Directory rename and move operations are very complex. Complexity is increased when the method adds filters to our operations. Filters describe what areas the method wants to include in our backup as well as areas to exclude. For example, the method might want to recursively backup all files under C:\datadir\, but exclude all files that have an mp3 extension. To reduce the complexity of the directory rename and move operations, a walk flag [W] was added to signal a walk of the directory structure. This is not the optimal way to deal with directory rename and move operations, but it is the least complex.

Figure 10:
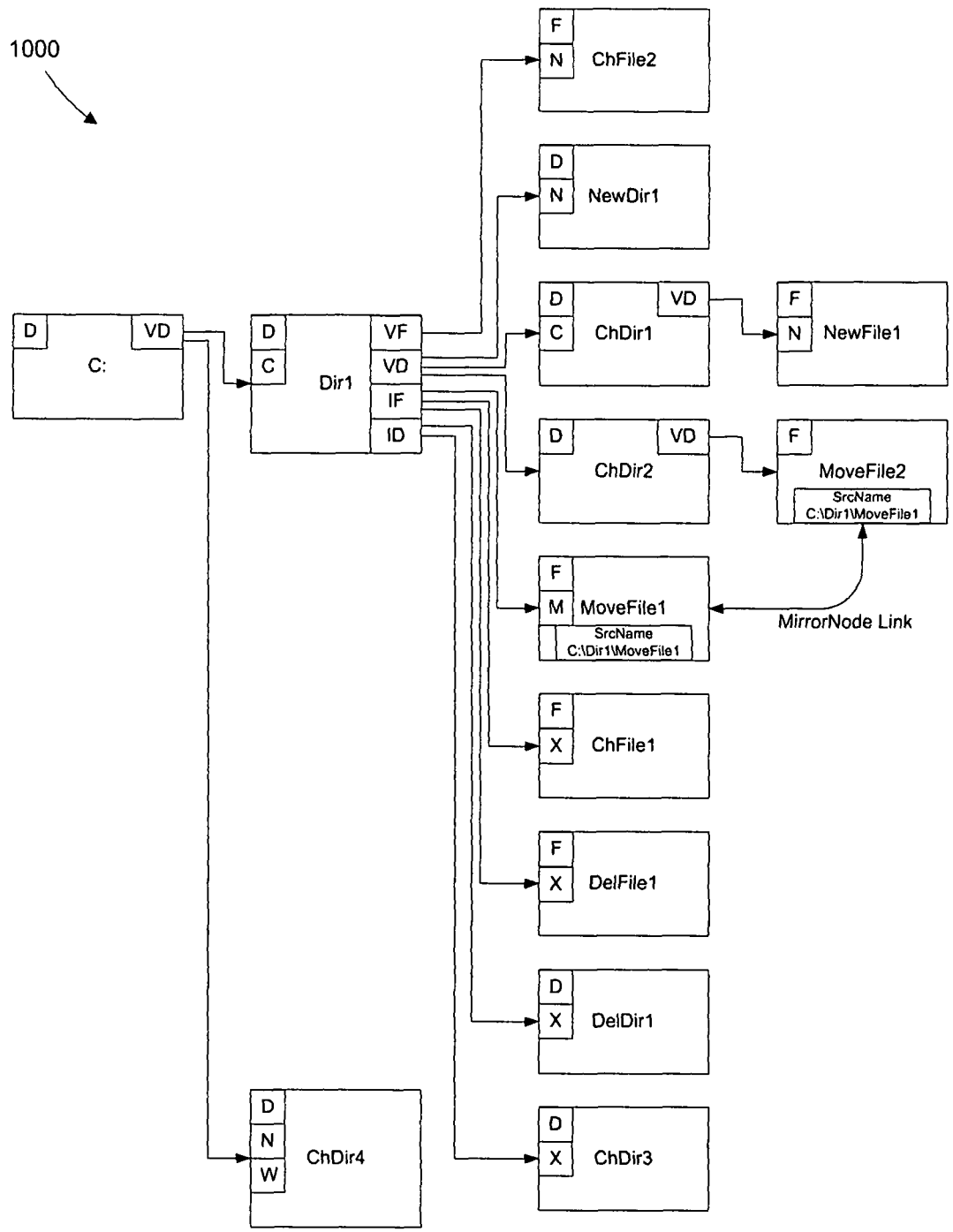
FIG. 10 shows inserting moves and renames of files and directories into a tree in accordance with an exemplary embodiment of the present invention.

To demonstrate object renames/moves into the tree, let's take FIG. 9 and perform the following operations in order, let's perform the following move operation: Move C:\Dir1\ChDir3 to C:\ChDir4. The resultant tree 1000 is shown in FIG. 10.

As a result of moving C:\Dir1\ChDir3 to C:\ChDir4, the method creates a new node, ChDir3, because it did not exist previously under Dir1's ID map and mark this directory node as Deleted [X]. The method also creates a new node, ChDir4, under C:'s VD map. The method mark ChDir4 as a directory that needs to be walked with Walk flag [W]. Walking this node involves walking the entire structure under ChDir4.

The descriptions above explain how to use all the flags in the node as well as host to insert various operations into the tree. It does not describe all the possible scenarios of entering operations into the tree, but does describe enough to get a good understanding of how operations are inserted into the tree. After parsing of the journal logs is finished and insertion of all the operations into the tree is finished, the next step is to parse the tree and perform a post-processing operation to clean up the tree before summarizing all the operations needed to backup the objects as described in the tree.

Figure 11:
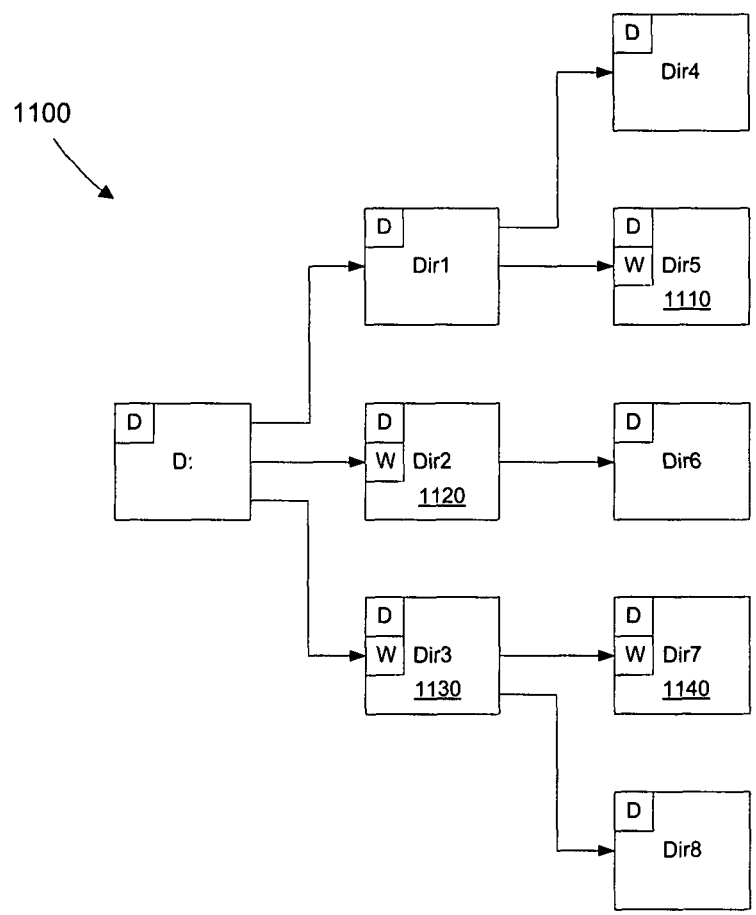
FIG. 11 shows post-processing of walk directory nodes accordance with an exemplary embodiment of the present invention.

Post-processing of the tree involves walking the top-level nodes of the tree with the Walk flag [W] set and performing some "cleaning" operations. FIG. 11 shows one simplified example of a tree 1100 representing the changes to a file system with a few of the directory nodes with the Walk flag [W] set. In this case, the top-level nodes with the Walk flag [W] are marked as 1110, 1120, and 1130 in the FIG. 11 diagram. Element 1140 would not need to automatically be processed since 1140 is covered under 1130.

When post-processing these top-level walk nodes (1110, 1120, and 1130), the method recursively walks these nodes to perform the following clean-up activities:

1. If the node is a file node, marked with the Move flag [M] and is an invisible file, it the source node for a file move/rename operation. This node is deleted and the destination node of the move operation, determined by looking at the mirror pointer inside the node, is marked as new.
2. If the node is a file node and its mirror pointer points to a valid node, then it is the destination node for a file move/rename operation. This node is deleted and the source node will be marked as a delete. This is done because its parent or a higher-level parent has the walk flag [W] set.
3. If the file node has the new flag [N] set or the changed flag [C], then the method just deletes the node. This is done because its parent or a higher-level parent has the walk flag [W] set and the walk process will eventually backup the file.
4. If the file node has the deleted flag [X] set, then the method just deletes the node. This is done because its parent or a higher-level parent has the walk flag [W] set and the walk process not backup a non-existent file.

When the post-processing "cleanup" of the tree is finished as described above, the tree is in a state ready to describe the summarized operations of what needs to be backed.

Summarization of the tree involves starting from the root node and recursively walking down the tree to performing backup operations. Every time a node has been successfully processed, the method sets the node's processed flag [P]. The method continues to recursively walk the root node of the tree until all nodes have been successfully processed. When all nodes have been successfully processed, this indicates the end of the backup.

A description of the summarization function is described here. The method creates a function called summarizeTree( ). The method calls the summarizeTree( ) function on the root node. For example, in the case of FIG. 6, the method would call summarizeTree(C:). The summarizeTree( ) function returns true when all nodes in all 4 maps (VF, VD, IF, ID) have the processed flag [P] set. The method continues to call the summarizeTree( ) function on the root node until it returns the value true indicating all nodes under the root node has been successfully processed.

The summarizeTree( ) function given a directory node is as follows:

1. For each visible file node in this directory node in the VF map:
    A. If the file node is part of a move operation, check and see if the source node exists (determined by looking at the mirror pointer in the node). If so, perform the move operation on the backup storage device and set the processed flag [P] for both the source node and destination node.
    B. If the file node has the changed flag [C] or the new flag [N] set, then backup this file onto the backup storage device and set the processed flag [P].
2. For each invisible file node in this directory node in the IF map:
    A. If the file node is part of a delete operation, perform the delete operation on the backup storage device and set the processed flag [P] for this node.
3. For each invisible directory node in this directory node in the ID map:
    A. Delete the directory from the backup storage device and set the processed flag [P] for this node. Invisible directory nodes are deleted nodes only since a directory move is a combination of a directory creation requiring a walk (destination) and a directory deletion (source).
4. For each visible directory node in this directory node in the VD map:

A. If the directory node does not have the processed flag [P] set, then call summarizeTree( ) on this directory node. If the summarizeTree( ) function returns true, it indicates the directory node is finished and thus sets the processed flag [P] for this directory node.
B. If the directory node has the walk flag [W] set, then recursively backup this directory and set the processed flag [P] for this node.
C. If the directory node has the new flag [N] set, then backup this directory (not the files in the directory) onto the backup storage device and set the processed flag [P] for this node. In essence, create the directory on the backup storage device.

5. If all the nodes in all 5 maps (VF, VD, IF, ID) have been marked as processed, the method returns the value true indicating this directory node has been fully processed.

Keep in mind that once a file node has been set with the processed flag [P] in the VF or IF map, it is no longer processed and is ignored if the tree is parsed again. Directories are a special case because there may be dependencies due to move operations that require parsing the directory again even if the directory node has already been marked as processed [P].

Figure 12:
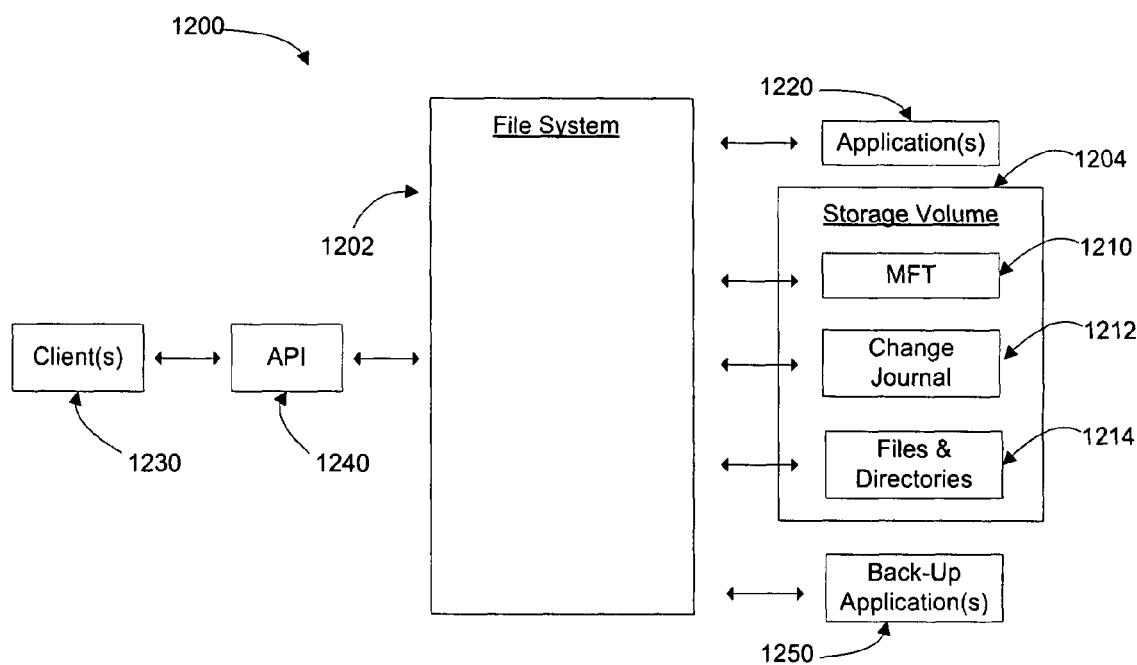
FIG. 12 is a block diagram of a file management system in accordance with an exemplary embodiment of the present invention.

FIG. 12 is a block diagram of a file management system 1200 in accordance with an exemplary embodiment of the present invention. In this embodiment, a file system 1202 manages a physical storage volume 1204 that stores a master file table (MFT) 1210, a change journal 1212, and various files and directories 1214. One or more applications 1220 requests file operations from the file system 1202, such as creating, deleting, reading and writing files. Further, one or more clients or computers 1230 accesses the change journal 1212 through an application-program-interface (API) 1240. As noted above, summarizations are provided to one or more backup applications 1250.

Embodiments in accordance with the present invention are not limited to any particular type or number of databases, storage device, storage system, and/or computer systems. The storage system, for example, includes one or more of various portable and non-portable computers and/or electronic devices, servers, main frame computers, distributed computing devices, laptops, and other electronic devices and systems whether such devices and systems are portable or non-portable.

As used herein, the term "storage device" means any data storage device capable of storing data including, but not limited to, one or more of a disk array, a disk drive, a tape drive, optical drive, a SCSI device, or a fiber channel device. By way of example, the computer/storage system 100 in FIG. 1 includes the storage device 104 as disk arrays that are network attached devices providing random access memory (RAM) and/or disk space (for storage and as virtual RAM) and/or some other forms of storage such as magnetic memory (example, tapes), micromechanical systems (MEMS), or optical disks, to name a few examples.

Further, as used herein, the terms "journaling" or "journal file system" and the like are file systems that use logs to record changes to a journal before actually writing the changes to the main file system. Further, the term "backup application" is software that copies data so that data can be restored after a data loss event. Backup applications are generally used to restore a computer or computer system to an operation state following a disaster (i.e., disaster recovery) or used to restore one or more files after the files have been corrupted or deleted.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
a storage device; and
a computer including a filesystem in communication with the storage device;
wherein the computer stores filesystem journal operations for file activities in a journal file system into a hierarchical tree, and
summarizes changes made to files in a filesystem in the hierarchical tree to determine which files require being read and backed up due to changes to content and which files have changed but do not require being read and backed up.

2. The computer system of claim 1 wherein the computer further:

stores the filesystem journal operations into a tree comprised of hash maps;
parses the hash maps to summarize the changes to the files over a period of time.

3. The computer system of claim 1 wherein the computer further sequentially reads the changes to the files as entries into the hierarchical tree.

4. The computer system of claim 1 wherein the computer further classifies the filesystem journal operations into one of (1) a first category that requires an entire file to be read and copied during backup and (2) a second category that does not require the entire file to be read and copied during backup even though changes to the file in the second category occurred.

5. The computer system of claim 1 wherein the computer further distinguishes between filesystem journal operations that require an entire file to be copied during backup and filesystem journal operations that indicate contents of a file remain unchanged.

6. The computer system of claim 1 wherein the computer further updates the filesystem journal operations in the hierarchical tree as changes are made to the files.

7. The computer system of claim 1, wherein the filesystem journal operations include adding a file, deleting a file, changing content in a file, and changing metadata associated with a file.

8. A non-transitory computer readable storage medium having instructions for causing a computer to execute a method, comprising:
 placing in a hierarchical tree filesystem journal operations to files and directories that occur over a period of time in a file system; and
 providing the filesystem journal operations to a backup application to determine which files in the filesystem require being backed up due to changes to content and which files in the filesystem have changes but do not require being backed up due to lack of changes to content.

9. The non-transitory computer readable storage medium of claim 8, wherein the journal operations include creating a file or a directory, deleting a file or a directory, changing metadata to a file or a directory, and modifying content to a file or a directory.

10. The non-transitory computer readable storage medium of claim 8 further comprising, continually updating the hierarchical tree as each entry in a journal is sequentially read into the hierarchical tree.

11. The non-transitory computer readable storage medium of claim 8 further comprising, parsing the hierarchical tree to summarize all changes that occurred to the hierarchical tree over a period of time.

12. The non-transitory computer readable storage medium of claim 8, providing the journal operations to the backup application to decrease an amount of time required to backup the file system.

13. The non-transitory computer readable storage medium of claim 8 further comprising, summarizing the journal operations to determine a location of a source of a file at a start time and a destination of the file at an end time.

14. The non-transitory computer readable storage medium of claim 8 further comprising, classifying the journal operations as being one of creating a file, deleting a file, moving a file without changing content, and changing metadata of a file without changing content.

15. The non-transitory computer readable storage medium of claim 8 further comprising, using changes in the hierarchical tree to distinguish between (1) files and directories that are modified and require backup and (2) files and directories that are modified but do not require backup.

16. A computing device, comprising:
 a memory for storing an algorithm; and
 a processor for executing the algorithm to:
  store filesystem journal entries for files in a journal file system; and
  summarize changes made to the filesystem journal entries to determine (1) which files require being read and backed up due to changes to content and (2) which files have change but do not require being read and backed up.

17. The computing device of claim 16, wherein the processor further executes the algorithm to sequentially read the filesystem journal entries into a tree.

18. The computing device of claim 16, wherein the processor further executes the algorithm to parse the filesystem journal entries and provide the journal entries to a backup application.

19. The computing device of claim 16, wherein the processor further executes the algorithm to store the filesystem journal entries in hash maps and summarize changes to the hash maps over a period of time.

20. The computing device of claim 16, wherein the processor further executes the algorithm to provide the filesystem journal entries to a backup application to decrease an amount of time required to backup the files in the journal file system.

* * * * *